June 17, 1941.  L. G. LEVOY, JR  2,246,178
ELECTRIC CONTROL CIRCUIT
Filed Aug. 31, 1940
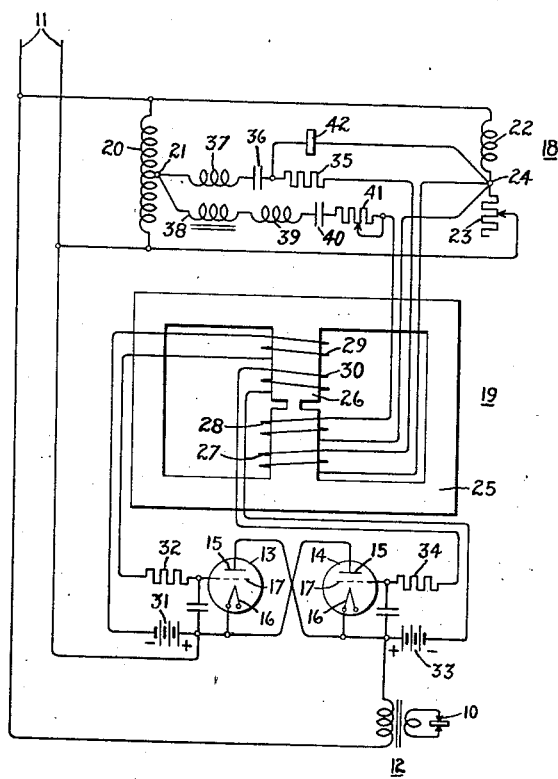
Inventor:
Louis G. Levoy, Jr.
by Harry E. Dunham
His Attorney.

Patented June 17, 1941

2,246,178

UNITED STATES PATENT OFFICE 2,246,178

ELECTRIC CONTROL CIRCUIT

Louis G. Levoy, Jr., Schenectady, N. Y., assignor to General Electric Company, a corporation of New York Application August 31, 1940, Serial No. 355,013

9 Claims. (Cl. 171—119)

My invention relates to electric control circuits and more particularly to circuits for controlling electric valve translating apparatus.

In many applications it is highly desirable to effect energization of the load circuit, such as an alternating current welding circuit, so that the current or energy transmitted thereto is maintained at a substantially constant value irrespective of the variations in the magnitude of the voltage of the associated alternating current supply circuit. Heretofore, various arrangements have been devised for maintaining the root-mean-square value of the current transmitted to an alternating current circuit through an electric valve apparatus substantially constant. However, many of these arrangements have involved the use of a considerable amount of equipment in addition to the usual apparatus required for energizing the control electrodes of the electric valve apparatus with periodic potential. In accordance with the teachings of my invention described hereinafter, I provide a new and improved control circuit for electric valve translating apparatus in which the periodic potentials applied to the control electrodes are automatically shifted in accordance with an electrical condition of one of the circuits interconnected by the electric valve means and which requires a minimum of equipment in addition to that required for an excitation circuit without the regulating features.

It is an object of my invention to provide a new and improved electric control circuit.

It is another object of my invention to provide a new and improved control system for electric valve translating apparatus.

It is still another object of my invention to provide an automatic regulating circuit which is characterized by its rapid response.

It is a still further object of my invention to provide an improved control system for maintaining the energy transmitted to an alternating current load circuit at a substantially constant value irrespective of variations in the voltage of the alternating current supply circuit which is characterized by its simplicity and reliability in operation.

In accordance with an illustrated embodiment of my invention, a pair of reversely connected electric valves are utilized to control the transfer of energy between an alternating current supply circuit and an alternating current load circuit, which in the particular embodiment illustrated is the transformer of a resistance welder. The initiation of an electric discharge in each of the reversely connected valves is controlled by an excitation circuit including an inductive device or transformer for producing voltages of peaked wave form having the periodicity of the alternating current supply. The peaking transformer is provided with a secondary winding associated with the control electrode of each of the valves for impressing the peaked voltage waves thereon and with two primary windings, one of which is excited with alternating current from the alternating current supply circuit through a static phase shifting circuit and the other winding which, to distinguish from the first primary winding will be designated a compensating winding, is energized from the same phase shifter but through a circuit which displaces the voltage impressed on the compensating winding with respect to the voltage impressed on the primary winding. The compensating winding is connected in series with a nonlinear inductive impedance element so that the magnitude and to some extent the phase relation of the voltage impressed on the compensating winding varies in response to the variations in the magnitude of the voltage of the alternating current supply circuit. Thus, the resultant magnetomotive force impressed on the core of the peaking transformer is varied in phase in accordance with the voltage of the alternating current circuit. There will also usually tend to be some change in the magnitude of the magnetomotive force but the effect of this change on the peaked secondary voltage is relatively slight. In this way it is possible to obtain an automatic shift in phase of the periodic potentials applied to the control electrodes of the electric valve apparatus to maintain the energy supplied to the welding circuit substantially constant with supply voltage variations which may, for example, be of the order of 30 per cent of the supply line voltage.

My invention will be better understood by reference to the following description taken in connection with the accompanying drawing and its scope will be pointed out in the appended claims.

In the drawing the single figure is a schematic representation of one embodiment of my invention.

Referring to the drawing, my invention is there illustrated as applied to an electric valve translating circuit for effecting energization of an alternating current load circuit such as an alternating current welding circuit 10 from an associated alternating current supply circuit 11 through a transformer 12 and a pair of reversely connected electric valve means 13 and 14. The electric valve means 13 and 14 are preferably of the type employing an ionizable medium, such as a gas or a vapor, and each comprises an anode 15, a cathode 16 and a control member or grid 17.

For the purpose of energizing the control member 17 with periodic voltages of peaked wave form, I provide a control circuit which, in the particular embodiment illustrated, includes a static phase shifting network 18 and a peaking transformer 19. The static phase shifting circuit includes an inductive element 20 which is connected across the alternating current supply line 11 and is provided with a terminal of intermediate potential 21. Connected in parallel with the inductive element 20 is a circuit including an inductance 22 and a variable resistor 23 in series, and a terminal 24 intermediate the inductive and resistive branches of the circuit. As is well understood by those skilled in the art, the adjustment of the resistor 23 is effective to regulate the phase of the voltage between terminals 21 and 24 with respect to the voltage of the alternating current supply circuit 11.

The peaking transformer 19 includes a three-legged core structure 25, the central leg 26 of which is formed of material having high permeability and low flux densities and a rather abrupt saturation characteristic. The central leg 26 is provided with a section of reduced cross-sectional area to determine the flux required to saturate the core. A primary winding 27, a compensating winding 28 and secondary windings 29 and 30 are all wound on the central leg 26 of the transformer core so that substantially the same flux links all of these windings. The secondary winding 29 is connected to impress the potentials induced therein between the cathode and control member of the electric valve means 13 through a circuit including the biasing battery 31 and current limiting resistance 32. Similarly, the secondary winding 30 is connected to impress peaked voltages of the periodicity of the alternating current circuit 11 on the control member of electric valve means 14 through a circuit including the biasing battery 33 and the current limiting resistor 34. The primary winding 27 is connected to be energized by the potential appearing between points 21 and 24 of the phase shifting network 18 through a circuit including a resistor 35, a capacitor 36 and a linear inductive impedance element 37. The capacitor 36 is dimensioned with respect to the inductive impedance element 37 and the primary winding 27 so that the circuit is tuned to the fundamental frequency of the alternating current supply circuit 11 so that a large impedance is offered to higher harmonics. This circuit prevents erratic operation from occurring as a result of the phase shift and distortion of the peaked secondary voltages which would otherwise be caused by harmonics of the supply voltage. A control circuit including a peaking transformer having the primary winding thereof energized through a circuit including a resistor and a series resonant filter tuned to the frequency of the supply is disclosed and claimed in my copending application Serial No. 349,735, filed August 2, 1940, and assigned to the same assignee as the present invention.

Inasmuch as the circuit connected between the terminals 21 and 24 and including the primary winding 27 is tuned to fundamental frequency, the impedance thereof is predominately resistive and the current through primary winding 27 is substantially in phase with the potential between terminals 21 and 24. In order to impress upon the compensating winding 28 a potential which differs in phase from that impressed on the primary 27, I provide a nonlinear circuit connected in series with the winding 28 and between the terminals 21 and 24 of the phase shifting circuit 18 which preferably comprises a nonlinear reactor 38, a linear reactor 39, a capacitor 40 and a variable resistor 41. The constants of the nonlinear circuit are chosen so that at a predetermined voltage of the alternating current supply the circuit is predominately inductive. Hence the current therethrough lags the voltage between terminals 21 and 24 by an angle approaching 90 degrees. The resultant magneto-motive force impressed on the core structure 25 by windings 27 and 28 is sinusoidal in character and displaced in phase with respect to the magnetomotive force produced by either of the windings 27 or 28 alone. An increase in voltage of supply circuit 11 causes the inductive impedance of reactor 38 to decrease. As a result the current through the compensating winding increases and since the magnetomotive force produced by winding 28 lags the magnetomotive force produced by winding 27 and increases in current in winding 28 causes the resultant magnetomotive force to be retarded. The reactor 39 and capacitor 40 are tuned substantially to the frequency of the supply line voltage and form a filter for the higher harmonics. A variable resistor 41 provides means for controlling the sensitivity of the compensating circuit. Although the saturation of nonlinear impedance 38 also causes a shift in phase of the magnetomotive force produced in winding 28 as well as a change in the magnitude thereof the circuit is preferably operated within a range where the inductive impedance predominates so that the change in magnitude is predominant. The circuit of compensating winding 28 may be viewed as a nonlinear resonant circuit operated below resonance. Since the circuits of windings 27 and 28 are coupled quite closely with the secondary windings 29 and 30 it is essential that neither forms a short circuited winding so far as the secondary voltage peaks are concerned. Since the filter circuits connected with both windings 27 and 28 are tuned substantially to the fundamental frequency they offer a large impedance to the steep wave-front voltages of the secondaries. By a proper consideration of the constants of the circuits of windings 27 and 28 it is possible to obtain a phase shift of the secondary peaked voltages which is just sufficient to maintain the output independent of voltage fluctuations in the supply line voltage. In some cases the amount of compensating action may be varied to get the proper compensating effect by connecting a nonlinear resistance 42, such as Thyrite, across the primary winding 27. The nonlinear resistor distorts the voltage wave impressed on the winding 27 as the voltage of circuit 11 increases in such a manner that the shift in phase of the peaked voltages produced in windings 29 and 30 is increased per unit of voltage variation in the supply voltage of circuit 11. A system embodying a variably resonant circuit as a voltage responsive means for controlling the phase of the secondary voltages of an excitation transformer is disclosed and claimed in the copending application of Harold W. Lord, Serial No. 198,342, filed March 26, 1938, which is a reissue of Patent No. 2,093,329, and assigned to the same assignee as the present invention.

The operation of the embodiment of my invention described above will now be described. The reversely connected valves 13 and 14 control the flow of the opposite half cycles of current from the source 11 through the welding transformer 12. The valves are normally rendered nonconductive by means of the biasing batteries 31 and 33 and are periodically rendered conductive by the periodic voltages of peaked wave form which are impressed on the control members thereof by the secondary windings 29 and 30 of the peaking transformer 19. For a given voltage of the alternating current circuit 11 the time in the alternating current cycle at which valves 14 and 15 become conductive is determined by adjusting the variable resistor 23 of the phase shifting circuit 18. The operation of the series resonant filter circuit including capacitor 36 and inductive impedance 37 and the cooperation thereof with the resistor 35 and the primary winding 27 is described in detail in my above-mentioned copending application. It is sufficient to state here that this circuit is effective to impress a magnetomotive force on the core structure 25 which is free from harmonics and which is substantially in phase with the voltage appearing between terminals 21 and 24. The winding 28 impresses a magnetomotive force on the core structure 25 which is lagging with respect to the magnetomotive force produced by the winding 27 since for the normal supply circuit voltage the circuit including winding 28 is highly inductive. If the voltage of circuit 11 increases the reactor 38 saturates and the current through winding 28 increases in magnitude so that the resultant magnetomotive force produced by windings 27 and 28 is retarded to such an extent that the peaked voltages which energize the control electrodes are retarded sufficiently to maintain the energy supplied to the load circuit constant. The nonlinear resistance 42 connected across the primary winding 27 distorts the voltage impressed thereon sufficiently to increase the compensating action for a given change in voltage of the supply circuit 11.

While I have shown and described a particular embodiment of my invention, it will be obvious to those skilled in the art that changes and modification may be made without departing from my invention and I, therefore, aim in the appended claims to cover all such changes and modifications as fall within the true spirit and scope of my invention.

What I claim as new and desire to secure by Letters Patent of the United States, is:

1. In combination, an alternating current supply circuit, a load circuit, electric translating apparatus connected between said supply circuit and said load circuit for transmitting energy therebetween and including electric valve means having a control member for controlling the conductivity thereof, a control circuit for energizing said control electrode with voltages of peaked wave form having the periodicity of said alternating current supply circuit including transformer means having a core structure with a saturable portion and a plurality of windings associated therewith, said windings including a first winding associated with said control member for impressing a control voltage of peaked wave form thereon, a second winding energized by an alternating current voltage of the frequency of said alternating current supply, and a third winding energized by an alternating current voltage of the frequency of said supply circuit and differing in phase relation from the voltage applied to said first winding, and means responsive to the voltage of said supply circuit for varying the magnitude of the voltage applied to said third winding to shift the phase of the voltage of peaked wave form impressed upon said control member to maintain the energy supplied to said load circuit substantially independent of voltage variations of said alternating current supply circuit.

2. In combination, an alternating current supply circuit, a load circuit, electric translating apparatus connected between said supply circuit and said load circuit for transmitting energy therebetween including electric valve means having a control member for controlling the conductivity thereof, a control circuit for energizing said control electrode with voltages having the periodicity of said alternating current supply circuit including transformer means having a core structure and a plurality of windings associated therewith, said windings including a first winding associated with said control member for impressing a control voltage thereon, a second winding energized by an alternating current voltage of the frequency of said alternating current supply, and a third winding energized by an alternating current voltage of the frequency of said supply circuit and differing in phase relation from the voltage applied to said first winding, and means responsive to the voltage of said supply circuit for varying the magnitude of the voltage applied to said third winding to shift the phase of the voltage impressed upon said control member to maintain the energy supplied to said load circuit substantially independent of voltage variations of said alternating current supply circuit.

3. In combination, an alternating current supply circuit, an alternating current load circuit, electric translating apparatus connected between said supply and said load circuits for transmitting energy therebetween and including a control member for controlling the conductivity thereof, a control circuit for maintaining the root-mean-square value of the current transmitted to said load circuit at a substantially constant value irrespective of voltage variations of said supply circuit comprising transformer means including a saturable core structure, a first winding for impressing voltages of peaked wave form at the periodicity of said alternating current supply circuit on said control member, a second winding energized by an alternating current voltage of the frequency of said supply circuit, and a third winding energized by a voltage having the frequency of said alternating current supply circuit and differing in phase relation with respect to the voltage impressed on said second winding, and means responsive to the voltage of said alternating current supply circuit for varying the phase of the resultant magnetomotive force produced in said core structure by said second and third windings to shift the phase relation of the peaked voltages produced in said first winding.

4. In combination, an alternating current supply circuit, an alternating current load circuit, reversely connected electric valve means connected between said supply circuit and said load circuit for transmitting energy thereto, a control electrode associated with each of said valve means, a control circuit for maintaining the energy supplied to said load circuit substantially constant irrespective of voltage variations of said supply circuit comprising transformer means including a core structure having a saturable portion, a winding associated with each of said control electrodes for impressing thereon periodic voltages of peaked wave form and of the periodicity of said alternating current supply circuit, a second winding energized by an alternating current voltage of the frequency of said supply circuit, and a third winding energized by a voltage of the frequency of said alternating current supply circuit and differing in phase from the voltage applied to said second winding, and means for varying the magnitude of the voltage impressed on said third winding in response to an electrical condition of said supply circuit to shift the phase of the resultant magnetomotive force impressed on said core structure by said second and third windings.

5. In combination, an alternating current supply circuit, a load circuit, electric translating apparatus connected between said supply circuit and said load circuit for transmitting energy therebetween including electric valve means having a control member for controlling the conductivity thereof, a control circuit for maintaining energy transmitted to said load circuit at a substantially constant value irrespective of voltage variations of said supply circuit comprising transformer means including a core structure having a saturable portion, a plurality of windings associated with said core structure in such a way that substantially the same flux links all of said windings, said windings including a first winding associated with the control electrodes of said electric valve means for impressing periodic potentials thereon, a second winding connected to be energized from said alternating current supply circuit through a circuit including a filter and a current limiting resistor for impressing a magnetomotive force on said core structure substantially in phase with the voltage impressed on the circuit of said second winding, a third winding connected to be energized from said alternating current supply circuit through a circuit including a nonlinear reactor so that the magnitude of the magnetomotive force produced by the combined action of said second and third windings is automatically shifted in phase in response to variations in the voltage of said alternating current supply circuit.

6. In combination, an alternating current supply circuit, a load circuit, electric translating apparatus connected to control the transfer of energy between said supply and load circuits including electric valve means having a control member for controlling the conductivity thereof, a control circuit for controlling the excitation of said control member in accordance with the voltage of said alternating current circuit comprising transformer means including a core structure having a saturable portion, a plurality of windings associated with said core structure and wound thereon so that substantially the same flux links all of said windings, said windings including a primary winding energized to produce a magnetomotive force in said core structure having the periodicity of said alternating current supply circuit, a compensating winding energized to produce a magnetomotive force in said core structure having the periodicity of said supply circuit and a magnitude dependent upon the voltage of said supply circuit but differing in phase from the magnetomotive force impressed on said core structure by said primary winding, and a secondary winding associated with the control electrode of said electric valve means for impressing periodic potentials of peaked wave form thereon having a phase relation determined by the resultant magnetomotive force of said primary and said secondary windings.

7. In combination, an alternating current supply circuit, a load circuit, electric translating apparatus connected between said supply circuit and said load circuit for transmitting energy therebetween including electric valve means having a control member for controlling the conductivity thereof, a control circuit for energizing said control electrode with voltages having the periodicity of said alternating current supply circuit including transformer means having a core structure and a plurality of windings associated therewith, said windings including a secondary winding associated with said control electrode, a primary winding energized from said alternating current supply circuit, a compensating winding energized from said alternating current supply circuit through a circuit including a nonlinear reactor, said primary and compensating windings being effective to produce a resultant magnetomotive force in said core structure having a phase relation with respect to the alternating current supply voltage which varies in accordance with voltage variations therein to maintain the output of said electric valve means substantially constant.

8. In combination, an alternating current supply circuit, a load circuit, electric translating apparatus interconnecting said circuits for supplying energy to said load circuit including electric valve means having a control member for controlling the conductivity thereof, a control circuit for maintaining the energy transmitted to said load circuit substantially constant irrespective of voltage variations of said supply circuit comprising transformer means having a core structure with a saturable portion and a plurality of windings associated therewith, said windings including a winding associated with said control member, a second winding and a third winding, all of said windings being wound on said core structure so that substantially the same flux links all the winding means for impressing a voltage of the periodicity of said alternating current supply circuit on the second winding through a predominately resistive circuit, means for impressing a voltage on said third winding of the frequency of said alternating current circuit through a predominately inductive circuit, and means for varying automatically the magnitude of the inductive impedance of the circuit of said third winding in response to voltage variations of said alternating current supply circuit so that the magnetomotive force impressed on said core structure is automatically varied in response to voltage variations of said supply circuit.

9. In combination, an alternating current supply circuit, an alternating current load circuit, a plurality of electric valve means connected between said supply circuit and said load circuit for transmitting energy therebetween, a control electrode associated with each of said valve means, a control circuit for maintaining root-mean-square value of current supplied to said load circuit substantially constant irrespective of voltage variation of said supply circuit comprising transformer means including a core structure having a saturable portion and a plurality of windings associated therewith, all of said windings being wound on said core structure so that substantially the same flux links all of said windings, said windings including a secondary winding portion associated with each of said control electrodes for impressing control voltages thereon, a primary winding energized from said alternating current supply circuit through a circuit including a filter and a current limiting resistor, and a compensating winding circuit connected in parallel with the circuit of said primary winding and including a compensating winding, a filter, and a variable impedance element, the impedance of which is variable in response to the magnitude of the voltage of said alternating current supply circuit, said primary and compensating windings being effective to impress a resultant magnetomotive force on said core structure having a phase relation which is dependent on the magnitude of the voltage of the alternating current supply circuit.

LOUIS G. LEVOY, Jr.